United States Patent
Hsu et al.

(10) Patent No.: US 10,824,320 B2
(45) Date of Patent: Nov. 3, 2020

(54) SYSTEMS AND METHODS FOR PRESENTING CONTENT

(71) Applicant: Facebook, Inc., Menlo Park, CA (US)

(72) Inventors: Joyce Hsu, Oakland, CA (US); Charles Matthew Sutton, San Francisco, CA (US); Jaime Leonardo Rovira, San Francisco, CA (US); Anning Hu, Menlo Park, CA (US); Chetan Parag Gupta, Menlo Park, CA (US); Cliff Warren, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 504 days.

(21) Appl. No.: 15/063,423

(22) Filed: Mar. 7, 2016

(65) Prior Publication Data

US 2017/0255372 A1 Sep. 7, 2017

(51) Int. Cl.
*G06F 3/0485* (2013.01)
*H04N 21/431* (2011.01)
(Continued)

(52) U.S. Cl.
CPC ......... *G06F 3/0485* (2013.01); *H04N 21/431* (2013.01); *H04N 21/47217* (2013.01); *H04N 21/816* (2013.01); *G06F 2203/04806* (2013.01)

(58) Field of Classification Search
CPC .............. H04N 21/4312; G06F 3/048–04897
See application file for complete search history.

(56) References Cited

U.S. PATENT DOCUMENTS

| 5,276,785 A | * | 1/1994 | Mackinlay | .......... G06F 3/04815 345/427 |
| 5,736,982 A | * | 4/1998 | Suzuki | .................... G06T 15/30 348/E7.083 |

(Continued)

FOREIGN PATENT DOCUMENTS

| CN | 101971606 | 2/2011 |
| CN | 102388406 | 3/2012 |
| WO | 2013184838 | 12/2013 |

OTHER PUBLICATIONS

International Application No. PCT/US2016/068694, International Search Report and Written Opinion dated Mar. 17, 2017.
(Continued)

*Primary Examiner* — Kieu D Vu
*Assistant Examiner* — Alvaro R Calderon, IV
(74) *Attorney, Agent, or Firm* — Sheppard Mullin Richter & Hampton LLP

(57) ABSTRACT

Systems, methods, and non-transitory computer-readable media can determine at least one request to access a content item, wherein the content item was composed using a set of camera feeds that capture at least one scene from a set of different positions. A viewport interface can be provided on a display screen of the computing device through which playback of the content item is presented, the viewport interface being configured to allow a user operating the computing device to virtually navigate the at least one scene by changing i) a direction of the viewport interface relative to the scene or ii) a zoom level of the viewport interface. A navigation indicator can be provided in the viewport interface, the navigation indicator being configured to visually indicate any changes to a respective direction and zoom level of the viewport interface during playback of the content item.

13 Claims, 11 Drawing Sheets

(51) Int. Cl.
*H04N 21/472* (2011.01)
*H04N 21/81* (2011.01)

(56) References Cited

U.S. PATENT DOCUMENTS

| | | | | |
|---|---|---|---|---|
| 6,002,401 A * | 12/1999 | Baker | G06F 16/10 | 715/839 |
| 6,222,557 B1 * | 4/2001 | Pulley, IV | G06T 11/206 | 345/622 |
| 6,241,609 B1 * | 6/2001 | Rutgers | A63F 13/12 | 345/419 |
| 6,401,034 B1 * | 6/2002 | Kaplan | G01C 21/3476 | 340/988 |
| 6,556,206 B1 * | 4/2003 | Benson | G06T 15/20 | 345/427 |
| 6,587,782 B1 * | 7/2003 | Nocek | G01C 21/3614 | 701/438 |
| 6,738,073 B2 * | 5/2004 | Park | G06T 3/0012 | 345/629 |
| 6,784,901 B1 * | 8/2004 | Harvey | H04L 12/1827 | 709/204 |
| 7,028,269 B1 * | 4/2006 | Cohen-Solal | G06K 9/3241 | 348/E5.043 |
| 7,298,930 B1 * | 11/2007 | Erol | G06K 9/00711 | 382/305 |
| 7,990,394 B2 * | 8/2011 | Vincent | G06T 17/05 | 345/419 |
| 8,239,130 B1 * | 8/2012 | Upstill | G01C 21/3679 | 701/400 |
| 8,433,512 B1 * | 4/2013 | Lopatenko | G01C 21/3679 | 701/400 |
| 8,566,029 B1 * | 10/2013 | Lopatenko | G08G 1/0962 | 701/426 |
| 8,700,392 B1 * | 4/2014 | Hart | G10L 15/25 | 704/231 |
| 8,855,926 B1 * | 10/2014 | Murphy | H04W 4/02 | 701/400 |
| 8,880,336 B2 * | 11/2014 | van Os | G01C 21/3635 | 345/173 |
| 9,043,005 B2 * | 5/2015 | Sandler | H04S 7/30 | 700/94 |
| 9,189,839 B1 * | 11/2015 | Sheridan | G06T 5/50 | |
| 9,212,927 B2 * | 12/2015 | Stroila | G01C 21/20 | |
| 9,870,429 B2 * | 1/2018 | Stirbu | G09G 5/00 | |
| 2003/0009281 A1 * | 1/2003 | Whitham | G01C 21/343 | 701/468 |
| 2003/0043170 A1 * | 3/2003 | Fleury | G06F 3/04815 | 345/619 |
| 2004/0013252 A1 * | 1/2004 | Craner | H04M 1/247 | 379/142.01 |
| 2004/0239699 A1 * | 12/2004 | Uyttendaele | G06F 16/748 | 715/716 |
| 2004/0263636 A1 * | 12/2004 | Cutler | H04N 7/15 | 348/211.12 |
| 2005/0188333 A1 * | 8/2005 | Hunleth | G06F 3/0481 | 715/860 |
| 2005/0280701 A1 * | 12/2005 | Wardell | H04M 3/568 | 348/14.08 |
| 2005/0281410 A1 * | 12/2005 | Grosvenor | H04H 60/04 | 381/61 |
| 2006/0256974 A1 * | 11/2006 | Oxford | H04R 3/005 | 381/66 |
| 2007/0076920 A1 * | 4/2007 | Ofek | G06T 3/4038 | 382/113 |
| 2007/0273758 A1 * | 11/2007 | Mendoza | G06F 16/9537 | 348/39 |
| 2008/0024594 A1 * | 1/2008 | Ritchey | H04N 5/2254 | 348/36 |
| 2008/0144794 A1 * | 6/2008 | Gardner | H04M 3/56 | 379/202.01 |
| 2008/0291217 A1 * | 11/2008 | Vincent | G06T 17/05 | 345/629 |
| 2009/0079740 A1 * | 3/2009 | Fitzmaurice | G06F 3/04815 | 345/427 |
| 2009/0100366 A1 * | 4/2009 | Fitzmaurice | G06T 15/20 | 715/767 |
| 2009/0148124 A1 * | 6/2009 | Athsani | G06Q 30/02 | 386/241 |
| 2009/0160996 A1 * | 6/2009 | Yamaoka | G06T 5/006 | 348/333.11 |
| 2009/0234473 A1 * | 9/2009 | Andersson | G01C 9/06 | 700/94 |
| 2009/0240431 A1 * | 9/2009 | Chau | G01C 21/3647 | 701/532 |
| 2009/0310851 A1 * | 12/2009 | Arcas | G06T 7/55 | 382/154 |
| 2009/0319178 A1 * | 12/2009 | Khosravy | G06Q 30/0241 | 701/408 |
| 2010/0020951 A1 * | 1/2010 | Basart | H04M 15/06 | 379/142.01 |
| 2010/0123737 A1 * | 5/2010 | Williamson | G01C 21/3647 | 345/672 |
| 2010/0208033 A1 * | 8/2010 | Edge | G06F 3/012 | 348/46 |
| 2010/0245257 A1 * | 9/2010 | Cragun | G06F 3/011 | 345/173 |
| 2010/0332324 A1 * | 12/2010 | Khosravy | G06Q 30/00 | 705/14.53 |
| 2011/0058662 A1 * | 3/2011 | Yoakum | H04M 3/51 | 379/202.01 |
| 2011/0173565 A1 * | 7/2011 | Ofek | G09B 29/00 | 715/790 |
| 2011/0208331 A1 * | 8/2011 | Sandler | H04S 7/30 | 700/94 |
| 2011/0279445 A1 * | 11/2011 | Murphy | G06F 3/04842 | 345/419 |
| 2011/0302527 A1 * | 12/2011 | Chen | G06F 3/0488 | 715/800 |
| 2011/0316884 A1 * | 12/2011 | Giambalvo | G06F 3/04815 | 345/660 |
| 2012/0033032 A1 * | 2/2012 | Kankainen | G01C 21/3647 | 348/36 |
| 2012/0062729 A1 * | 3/2012 | Hart | G06F 1/1626 | 348/135 |
| 2012/0099804 A1 * | 4/2012 | Aguilera | G06T 15/20 | 382/285 |
| 2012/0254791 A1 * | 10/2012 | Jackson | G06F 3/04815 | 715/781 |
| 2012/0254792 A1 * | 10/2012 | Husoy | G06F 3/0481 | 715/782 |
| 2012/0311486 A1 | 12/2012 | Reyna | | |
| 2013/0006525 A1 * | 1/2013 | Stroila | G01C 21/20 | 701/434 |
| 2013/0039632 A1 * | 2/2013 | Feinson | H04N 5/77 | 386/223 |
| 2013/0050260 A1 * | 2/2013 | Reitan | G06F 3/011 | 345/633 |
| 2013/0090850 A1 * | 4/2013 | Mays | G01C 21/36 | 701/533 |
| 2013/0129304 A1 * | 5/2013 | Feinson | H04N 13/167 | 386/223 |
| 2013/0135344 A1 * | 5/2013 | Stirbu | G06F 17/30893 | 345/629 |
| 2013/0191359 A1 * | 7/2013 | Meadow | G06T 17/05 | 707/705 |
| 2013/0222371 A1 * | 8/2013 | Reitan | G06T 19/006 | 345/419 |
| 2013/0249948 A1 * | 9/2013 | Reitan | G06F 3/011 | 345/633 |
| 2013/0300648 A1 * | 11/2013 | Kim | G06F 3/011 | 345/156 |
| 2013/0321401 A1 * | 12/2013 | Piemonte | G01C 21/3635 | 345/419 |
| 2013/0321461 A1 * | 12/2013 | Filip | G06F 3/011 | 345/632 |
| 2013/0325319 A1 * | 12/2013 | Moore | G01C 21/36 | 701/412 |

(56) References Cited

U.S. PATENT DOCUMENTS

| | | | |
|---|---|---|---|
| 2013/0332890 A1* | 12/2013 | Ramic | G06F 3/04815 715/852 |
| 2013/0335407 A1 | 12/2013 | Reitan | |
| 2014/0063061 A1* | 3/2014 | Reitan | G09G 3/003 345/633 |
| 2014/0163863 A1* | 6/2014 | Kirsch | G01C 21/3679 701/400 |
| 2014/0244165 A1* | 8/2014 | Bells | G01C 21/367 701/455 |
| 2014/0244651 A1* | 8/2014 | Liu | G01C 21/3685 707/740 |
| 2014/0278067 A1* | 9/2014 | Gordon | G01C 21/367 701/457 |
| 2014/0294183 A1* | 10/2014 | Lee | H04R 3/005 381/56 |
| 2015/0049080 A1* | 2/2015 | Purayil | H04L 67/2847 345/419 |
| 2015/0103102 A1 | 4/2015 | Bailiang | |
| 2015/0185990 A1 | 7/2015 | Thompson | |
| 2015/0248170 A1 | 9/2015 | Abovitz et al. | |
| 2015/0285652 A1* | 10/2015 | Peri | G01C 21/3476 701/438 |
| 2015/0310596 A1* | 10/2015 | Sheridan | G06T 5/50 382/284 |
| 2016/0154538 A1* | 6/2016 | Wang | G09B 29/007 715/771 |
| 2017/0062012 A1* | 3/2017 | Bloch | G11B 27/34 |
| 2017/0370733 A1* | 12/2017 | Garrett | G01S 19/42 |

OTHER PUBLICATIONS

European Patent Application No. 17154440.6, Search Report dated Aug. 1, 2017.
Chinese Patent Application No. 201680085369.4, Search Report dated Aug. 19, 2020, 10 pages.

* cited by examiner

500

Determine at least one request to access a content item, wherein the content item was composed using a set of camera feeds that capture at least one three-dimensional scene from a set of different positions
502

Provide a viewport interface, the viewport interface being configured to allow a user to virtually navigate the at least one three-dimensional scene by changing i) a direction of the viewport interface relative to the three-dimensional scene or ii) a zoom level of the viewport interface
504

Provide a navigation indicator in the viewport interface, the navigation indicator being configured to visually indicate any changes to a respective direction and zoom level of the viewport interface during playback of the content item
506

FIGURE 5

SYSTEMS AND METHODS FOR PRESENTING CONTENT

FIELD OF THE INVENTION

The present technology relates to the field of content presentation. More particularly, the present technology relates to techniques for presenting content items through computing devices.

BACKGROUND

Today, people often utilize computing devices (or systems) for a wide variety of purposes. Users can operate their computing devices to, for example, interact with one another, create content, share content, and access information. Under conventional approaches, content items (e.g., images, videos, audio files, etc.) can be made available through a content sharing platform. Users can operate their computing devices to access the content items through the platform. Typically, the content items can be provided, or uploaded, by various entities including, for example, content publishers and also users of the content sharing platform. In some instances, the content items can be categorized and/or curated.

SUMMARY

Various embodiments of the present disclosure can include systems, methods, and non-transitory computer readable media configured to determine at least one request to access a content item, wherein the content item was composed using a set of camera feeds that capture at least one scene from a set of different positions. A viewport interface can be provided on a display screen of the computing device through which playback of the content item is presented, the viewport interface being configured to allow a user operating the computing device to virtually navigate the at least one scene by changing i) a direction of the viewport interface relative to the scene or ii) a zoom level of the viewport interface. A navigation indicator can be provided in the viewport interface, the navigation indicator being configured to visually indicate any changes to a respective direction and zoom level of the viewport interface during playback of the content item.

In some embodiments, the systems, methods, and non-transitory computer readable media are configured to determine a respective direction of at least one point of interest in the scene and cause the navigation indicator to visually indicate the respective direction of the at least one point of interest in addition to visually indicating the direction and zoom level of the viewport interface.

In some embodiments, the systems, methods, and non-transitory computer readable media are configured to determine a respective direction of at least one sound produced in the scene during playback of the content item and cause the navigation indicator to visually indicate the respective direction of the at least one sound in addition to visually indicating the direction and zoom level of the viewport interface.

In some embodiments, the systems, methods, and non-transitory computer readable media are configured to determine that the content item is associated with an auto mode that specifies information for virtually navigating a set of points of interest in the scene, cause the navigation indicator to visually indicate that the auto mode is enabled, and cause the viewport interface to virtually navigate the scene based at least in part on the auto mode.

In some embodiments, the auto mode information also specifies respective trajectories for guiding the viewport interface in the scene while virtually navigating between points of interest in the set of points of interest.

In some embodiments, the systems, methods, and non-transitory computer readable media are configured to determine that the user has performed one or more operations to change the direction of the viewport interface or the zoom level of the viewport interface, cause the auto mode to be disabled, cause the viewport interface to correspond to the changed direction or zoom level, and cause the navigation indicator to visually indicate the changed direction or zoom level, wherein the navigation indicator no longer indicates that the auto mode is enabled.

In some embodiments, the systems, methods, and non-transitory computer readable media are configured to determine that a threshold amount of time has elapsed since the user performed the one or more operations to change the direction or the zoom level of the viewport interface, cause the auto mode to be re-enabled, and cause the navigation indicator to visually indicate that the auto mode is enabled.

In some embodiments, the systems, methods, and non-transitory computer readable media are configured to determine that the user has performed one or more operations to change the direction of the viewport interface or the zoom level of the viewport interface, cause the viewport interface to correspond to the changed direction or zoom level, and cause the navigation indicator to visually indicate the direction and zoom level of the viewport interface.

In some embodiments, the systems, methods, and non-transitory computer readable media are configured to determine that the user has performed a touch gesture on a region of the display screen that corresponds to the navigation indicator and cause the viewport interface to correspond to a direction and zoom level that was specified by a publisher of the content item.

In some embodiments, the one or more operations include at least one touch gesture or device gesture.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example method for providing a navigation indicator accessing content through an interface, according to an embodiment of the present disclosure.

Figure 1:
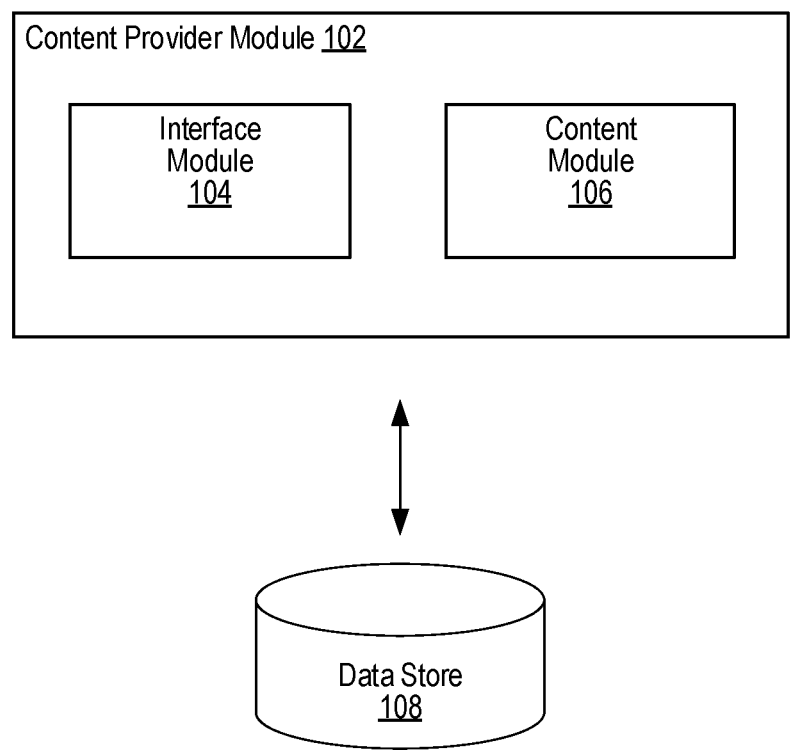
FIG. 1 illustrates an example system including an example content provider module configured to provide content to users, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Presenting Content

People use computing devices (or systems) for a wide variety of purposes. As mentioned, under conventional approaches, a user can utilize a computing device to share content items (e.g., documents, images, videos, audio, etc.) with other users. Under conventional approaches, content items (e.g., images, videos, audio files, etc.) can be made available through a content sharing platform. Users can operate their computing devices to access the content items through the platform. Typically, the content items can be provided, or uploaded, by various entities including, for example, content publishers and also users of the content sharing platform.

In some instances, a user can access virtual content, for example, through a display screen of their computing device, a virtual reality system, and/or a head mounted display. The virtual content may be composed using one or more videos and/or images that capture scenes such as geographic locations and/or activities being performed, for example. Such scenes may be captured from the real world and/or be computer generated. In some instances, the virtual content is composed so that the user is able to navigate within the scenes captured by the virtual content. Thus, by accessing the virtual content, the user is able experience and navigate the captured scenes virtually, for example, as if the user were physically present at a given location and/or physically performing an activity represented in the scenes.

The virtual content may be a spherical video that captures a 360 degree view of a scene, for example. The spherical video can be created by stitching together various video streams, or feeds, that were captured by cameras that are placed at different locations and/or positions to capture a 360 degree view of the scene. Once stitched together, a user can access, or playback, the spherical video to view a portion of the spherical video at some angle. Generally, while accessing the spherical video, the user can zoom and change the direction (e.g., pitch, yaw, roll) of the viewport to access another portion of the scene captured by the spherical video. Given the nature of virtual content, the user may have difficulty keeping track of changes made to the zoom level and/or the direction of the viewport. Such changes may deviate from the intended zoom level and/or viewport direction of the virtual content that may have been specified by a publisher of the virtual content. In some instances, not being able to track the changes to the zoom level and/or viewport direction may cause the user to become disorientated and such disorientation may degrade the user experience. Accordingly, such conventional approaches may not be effective in addressing these and other problems arising in computer technology.

An improved approach overcomes the foregoing and other disadvantages associated with conventional approaches. In various embodiments, a navigation element or indicator can be provided in an interface, or viewport, through which virtual content is presented. The navigation indicator can automatically be updated as the user interacts with the virtual content to visually indicate i) a direction, or heading, of the viewport within the scenes captured by the virtual content and/or ii) a zoom level of the viewport. In such embodiments, a user accessing virtual content can rely on the navigation indicator to determine the direction and/or zoom level at any given point during the viewing experience. As a result, users are less likely to become disoriented while accessing content.

FIG. 1 illustrates an example system 100 including an example content provider module 102 configured to provide content items to users, according to an embodiment of the present disclosure. As shown in the example of FIG. 1, the content provider module 102 can include an interface module 104 and a content module 106. In some instances, the example system 100 can include at least one data store 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user computing device or client computing system. For example, the content provider module 102, or at least a portion thereof, can be implemented as or within an application (e.g., app), a program, or an applet, etc., running on a user computing device or a client computing system, such as the user device 610 of FIG. 6. Further, the content provider module 102, or at least a portion thereof, can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6. It should be understood that there can be many variations or other possibilities.

In various embodiments, the content provider module 102 can utilize the interface module 104 and the content module 106 to provide content items to users. The interface module 104 can be configured to provide a viewport (e.g., graphical user interface) through which content items can be presented (e.g., streamed). For example, the viewport can be provided through a software application running on a computing device that is being operated by a user and the viewport can be presented through a display screen of the computing device. The user can interact with the viewport, for example, through an input device or by performing touch screen gestures through the display screen. More details regarding the interface module 104 will be provided below in reference to FIG. 2.

The content module 106 can be configured to provide various types of content items that can be presented through the interface provided by the interface module 104. In various embodiments, the content module 106 can provide virtual content that may be composed using one or more videos and/or images that capture scenes (e.g., geographic locations and/or activities being performed). Such scenes may be captured from the real world and/or be computer generated. The virtual content may be any content that captures 360 degree views and/or any three-dimensional (3D) content. Further, the virtual content may include content that is any size greater than a viewport is capable of presenting at a given moment. In such instances, the viewport can present different portions of the content as the viewport position is changed. In one example, the virtual content may be created using generally known image stitching techniques including, for example, rectilinear stitching, spherical stitching, cubical stitching, to name some examples. In another example, the virtual content may be a spherical video that captures a 360 degree view of a scene such as a point of interest. Some other examples of virtual content can include videos composed using monoscopic 360 degree views, videos composed using stereoscopic 180 degree views, etc. The spherical video can be created by stitching together various video streams, or feeds, that were captured by cameras that are placed at different locations and/or positions to capture a 360 degree view of the scene. Such video streams may be pre-determined for various angles (e.g., 0 degree, 30 degrees, 60 degrees, etc.) of the spherical video. Once stitched together, a user can access, or playback, the spherical video to view a portion of the spherical video at some angle. The portion of the spherical video shown to the user can be determined based on the location and direction of the user's viewport in three-dimensional space.

In some embodiments, the content provider module 102 can be configured to communicate and/or operate with the at least one data store 108 in the example system 100. The at least one data store 108 can be configured to store and maintain various types of data. In various embodiments, the at least one data store 108 can store data relevant to function and operation of the content provider module 102. One example of such data are virtual content items that are available for access through the interface provided by the interface module 104. In some implementations, the at least one data store 108 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data. It should be appreciated that there can be many variations or other possibilities.

Figure 2:
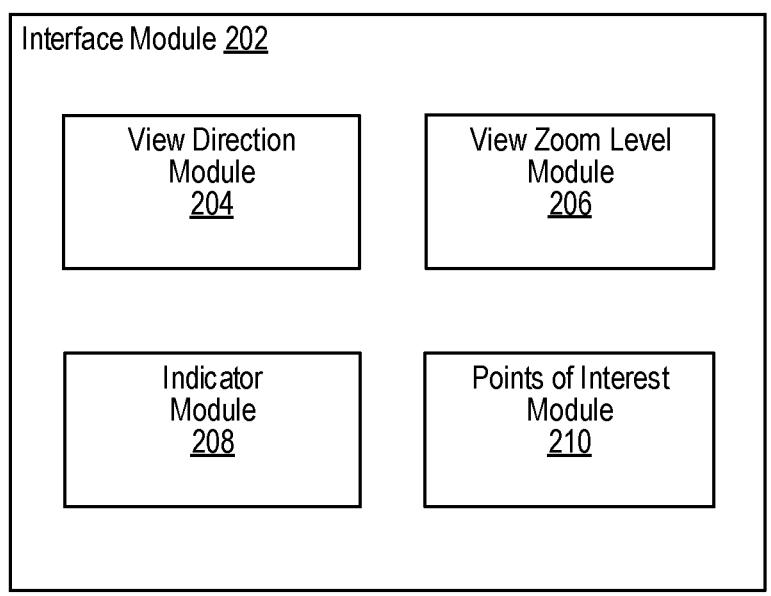
FIG. 2 illustrates an example of an interface module configured to provide an interface for accessing content items, according to an embodiment of the present disclosure.

FIG. 2 illustrates an example 200 of an interface module 202 configured to provide an interface for accessing content items, according to an embodiment of the present disclosure. In some embodiments, the interface module 104 of FIG. 1 can be implemented with the interface module 202. As shown in the example of FIG. 2, the interface module 202 can include a view direction module 204, a view zoom level module 206, an indicator module 208, and a points of interest module 210.

As mentioned, the interface module 202 can be configured to provide a viewport (e.g., graphical user interface) through which content items (e.g., virtual content items) can be presented and accessed. In various embodiments, a user can access virtual content items that are provided through the content module 106 of FIG. 1 using a computing device being operated by the user. The computing device may be any device that is capable of processing and presenting content including, for example, mobile phones, tablets, a virtual reality system, and/or a head mounted display. Once accessed, the interface module 202 can present the virtual content item through a display of the computing device.

When the virtual content item is initially accessed, the viewport associated with the computing device may display a certain portion of a scene of the virtual content item. The portion shown can be based on the position and/or direction (e.g., pitch, yaw, roll) of the viewport in relation to the scene. In some embodiments, the user can view different portions of the scene by virtually navigating through the scene(s) captured by the virtual content item. For example, the user can change, or adjust, the viewport by virtually changing the position and/or direction of the viewport. Such changes to the viewport may be determined in real-time by the view direction module 204 as the user interacts with the virtual content item. In another example, the user can also change the zoom level of the viewport while accessing a given scene. For example, the user may want to increase, or decrease, the zoom level of the viewport to view some portion of the scene. Such changes to the viewport zoom level can be determined in real-time by the view zoom level module 206. The user can make changes to the viewport (e.g., position, direction, zoom, etc.), for example, by performing touch gestures (e.g., swipe gestures, drag gestures, slide gestures, tap gestures, double tap gestures, pinch gestures, spread gestures, rotate gestures, flick gestures, etc.) and/or computing device gestures. Computing device gestures (e.g., tilt) can be determined using one or more sensors (e.g., gyroscopes, accelerometers, and/or inertial measurement units) in the computing device, for example. Further, if accessing the virtual content item through a virtual reality head mounted display, the user may change the direction of the viewport by changing the direction of the user's head. Naturally, other approaches may be utilized for navigating and zooming within a spherical video. In general, changes, or adjustments, to the viewport can be monitored, in real-time (e.g., constantly or at specified time intervals) by the view direction module 204 and the view zoom level module 206. Such changes can then be used to update the viewport so that appropriate images and/or streams from the virtual content item can be presented to the user, as determined based on the changes to the viewport.

As mentioned, in some instances, not being able to track the changes to the viewport may cause the user to become disorientated with respect to the virtual content being accessed and such disorientation may degrade the user experience. Thus, in various embodiments, the indicator module 208 can be configured to provide a navigation indicator in the viewport through which virtual content is presented. In some embodiments, the navigation indicator is provided as an overlay within the viewport. The navigation indicator can visually indicate i) a direction, or heading, of the viewport in the scene(s) captured by the virtual content and/or ii) a zoom level of the viewport within the scene(s).

In some embodiments, the direction indicated by the navigation indicator can be determined based on yaw (i.e., movement of the viewport along a vertical axis). However, depending on the implementation, the navigation indicator may also indicate the pitch (i.e., movement of the viewport along a lateral axis) and/or roll (i.e., movement of the viewport along a longitudinal axis). The navigation indicator can automatically be updated as the user interacts with the virtual content to reflect the direction and/or zoom level of the viewport at any given point while the virtual content item is being accessed. More details regarding the navigation indicator will be provided below in reference to FIGS. 3A-F and 4A-C.

In some embodiments, the points of interest module 210 can be used to identify various points of interest within the scenes of the virtual content item being accessed. Such points of interest may be specified, for example, by a publisher of the virtual content item. In general, each point of interest can be associated with a given location within the scene(s) captured by the virtual content item. In some embodiments, the navigation indicator can identify points of interest that are within a threshold distance of the viewport location in a scene being presented through the viewport. In such embodiments, the navigation indicator can visually indicate the respective direction of a point of interest. More details regarding points of interest will be provided below in reference to FIGS. 3E and 4A.

Figure 3A:
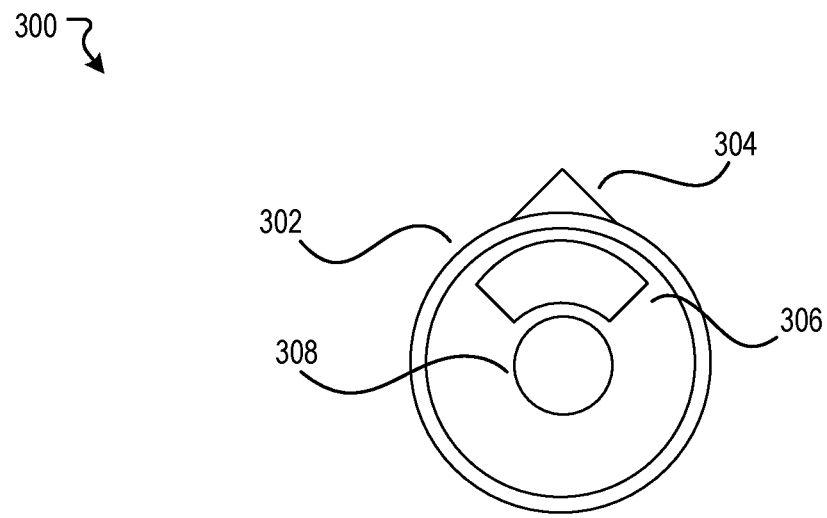
FIGS. 3A-F illustrate examples of a navigation indicator that can be presented in a viewport interface when a content item is being accessed, according to an embodiment of the present disclosure.

FIG. 3A illustrates an example 300 of a navigation indicator 302 that can be presented in a viewport interface when a content item (e.g., virtual content item) is being accessed. In FIG. 3A, the navigation indicator 302 indicates an initial, or intended, direction 304 of the viewport while the virtual content item is being accessed. The direction 304 may be specified by a publisher of the virtual content item, for example, and may change at different points in time during playback of the virtual content item. The navigation indicator 302 also includes a heading indicator 306 that indicates a direction, or heading, of the viewport while accessing the scene(s) captured by the virtual content. In this example, the direction of the viewport is indicated by the direction of the heading indicator 306. As the viewport direction changes, the heading indicator 306 can rotate around a point 308 to face a direction that corresponds to the updated viewport direction. In some embodiments, the direction indicated by the heading indicator 306 corresponds to the movement of the viewport along a vertical axis (i.e., yaw). The heading indicator 306 can also indicate a zoom level of the viewport in the scene(s) being accessed. In some embodiments, the length, or size, of the heading indicator 306 increases, or elongates, around the point 308 to indicate a higher zoom level of the viewport. In such embodiments, the length, or size, of the heading indicator 306 decreases, or constricts, around the point 308 to indicate a reduced zoom level of the viewport. In some embodiments, a virtual content item may be associated with a default zoom level (e.g., 60 degrees or some other specified zoom level). In some embodiments, a publisher of a virtual content item may specify a minimum and/or maximum zoom level that may be applied through the viewport.

Figure 3B:
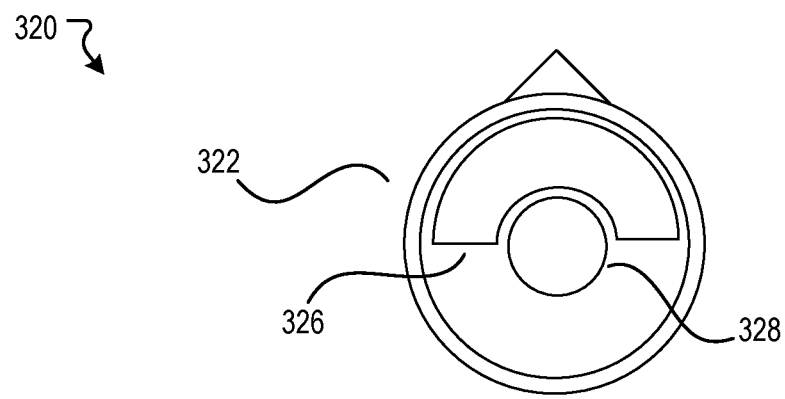

FIG. 3B illustrates an example 320 of a navigation indicator 322 that can be presented in a viewport interface when a content item (e.g., virtual content item) is being accessed. In FIG. 3B, the viewport accessing the virtual content item is zoomed in to a scene. As a result, the heading indicator 326 is shown as being elongated, or increased in size, around the point 328 to indicate the increased zoom level of the viewport.

Figure 3C:
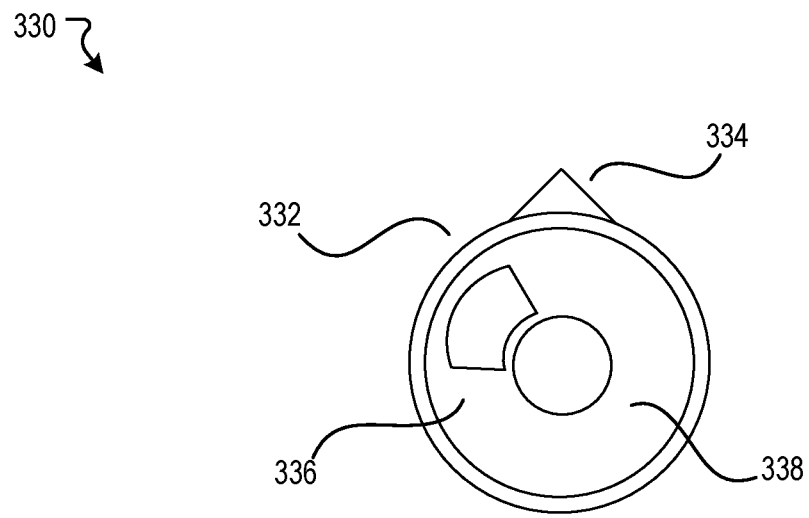

FIG. 3C illustrates an example 330 of a navigation indicator 332 that can be presented in a viewport interface when a content item (e.g., virtual content item) is being accessed. In FIG. 3C, the direction of the viewport accessing the virtual content item is facing west, or left, relative to the initial, or intended, direction 334 of the viewport. Further, the viewport is zoomed out from the scene being viewed. As a result, the heading indicator 336 is shown as being rotated to the left around the point 338 to indicate the direction of the viewport. Further, the heading indicator 336 is shown as being constricted, or decreased in size, around the point 338 to indicate the decreased zoom level of the viewport.

Figure 3D:
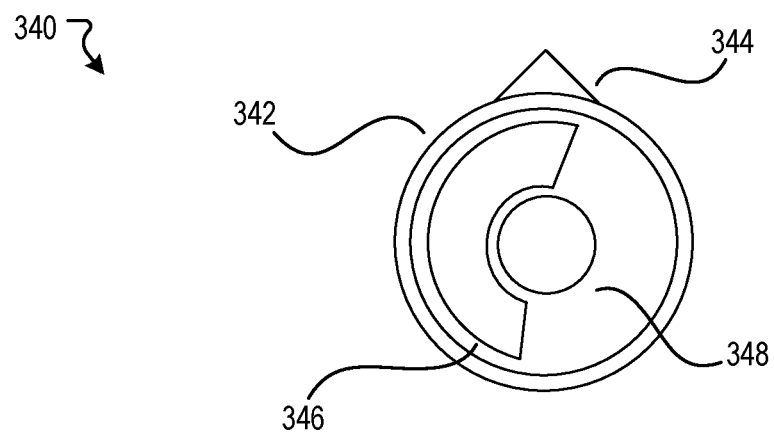

FIG. 3D illustrates an example 340 of a navigation indicator 342 that can be presented in a viewport interface when a content item (e.g., virtual content item) is being accessed. In FIG. 3D, the viewport accessing the virtual content item is zoomed in to a scene of the virtual content item. Moreover, the direction of the viewport accessing the virtual content item is facing west, or left, relative to the initial, or intended, direction 344 of the viewport. As a result, the heading indicator 346 is shown as being elongated, or increased in size, around the point 348 to indicate the increased zoom level of the viewport. Further, the heading indicator 346 is also shown as being rotated to the left around the point 348 to indicate the direction of the viewport.

Figure 3E:
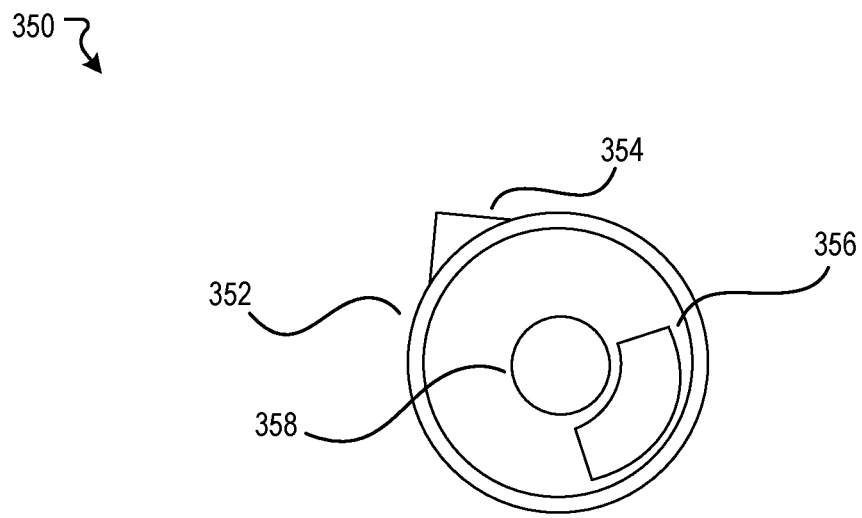

FIG. 3E illustrates an example 350 of a navigation indicator 352 that can be presented in a viewport interface when a content item (e.g., virtual content item) is being accessed. In FIG. 3E, the initial, or intended, direction 354 of the viewport has been updated. Changes to the intended direction 354 may result at different points in time during playback of the virtual content item, for example, when accessing a scene through which the viewport is guided (e.g., a view from a moving vehicle). In this example, the viewport accessing the virtual content item is facing an opposite direction relative to the intended direction 354 of the viewport. As a result, the heading indicator 356 is shown as being rotated around the point 358 in an opposite direction relative to the intended direction 354.

Figure 3F:
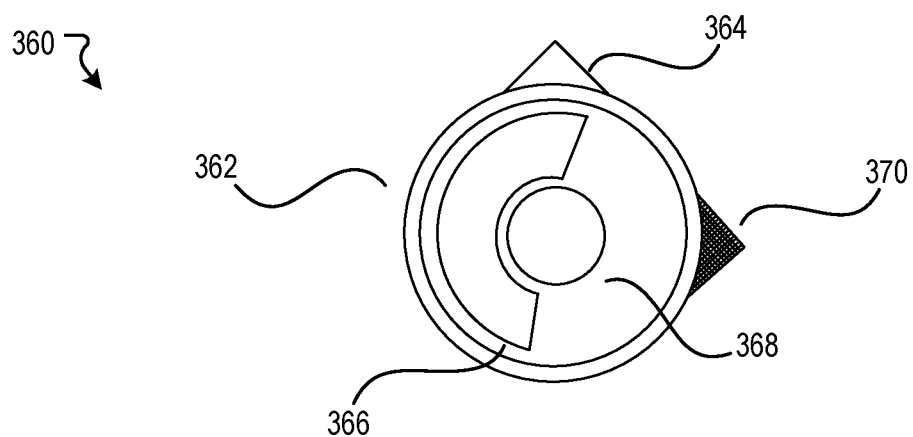

FIG. 3F illustrates an example 360 of a navigation indicator 362 that can be presented in a viewport interface when a content item (e.g., virtual content item) is being accessed. In FIG. 3F, the viewport accessing the virtual content item is zoomed in to a scene of the virtual content item. Further, the direction of the viewport accessing the virtual content item is facing west, or left, relative to the initial, or intended, direction 364 of the viewport. As a result, the heading indicator 366 is shown as being elongated, or increased in size, around the point 368 to indicate the increased zoom level of the viewport. Further, the heading indicator 366 is also shown as being rotated to the left around the point 368 to indicate the direction of the viewport. In some embodiments, the navigation indicator 362 can identify various points of interest within the scenes of the virtual content item being accessed. In such embodiments, the navigation indicator 362 can visually indicate the respective direction 370 of a point of interest, for example, relative to the direction 364 and/or the heading indicator 366. Such points of interest may be specified, for example, by a publisher of the virtual content item. In general, each point of interest can be associated with a given location within the scene(s) captured by the virtual content item with respect to a point in time corresponding to the scene (e.g., stream or feed) being accessed. In some embodiments, the navigation indicator 362 can identify points of interest that are within a threshold distance of the viewport location in a scene being presented through the viewport.

Figure 4A:
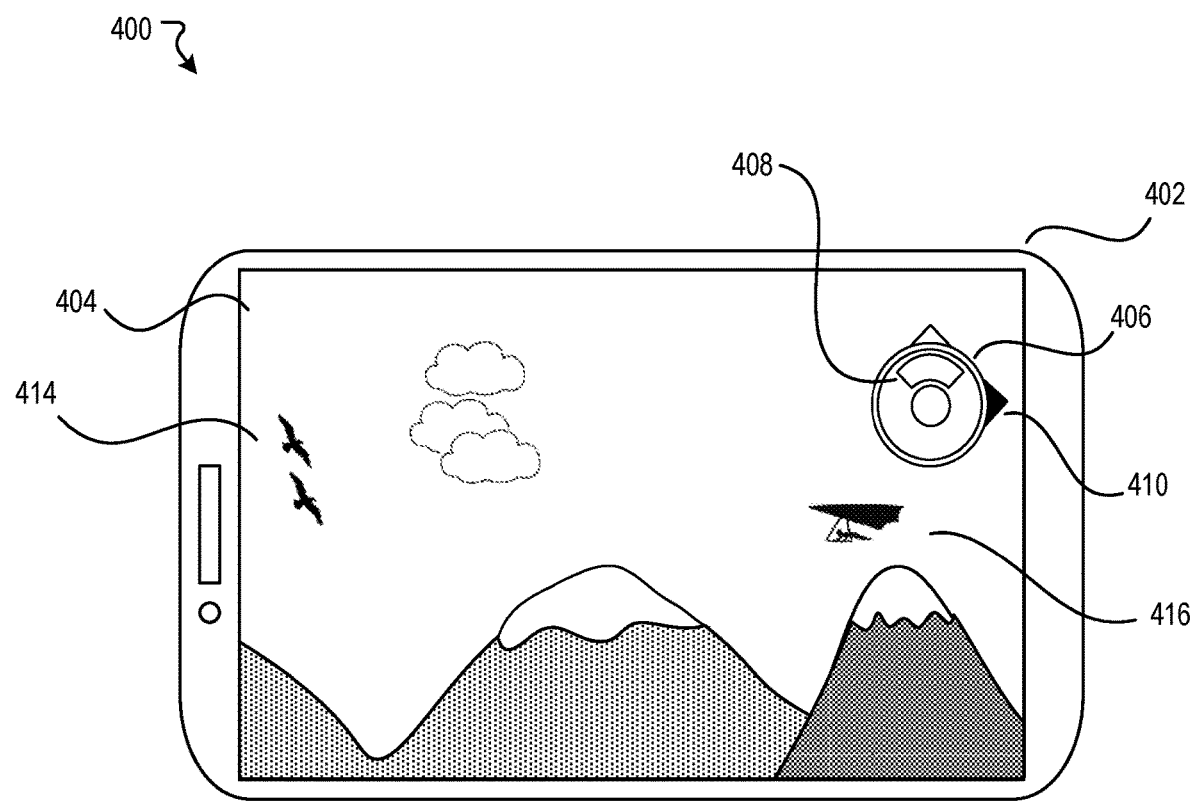
FIGS. 4A-C illustrate examples of a viewport interface in which a navigation indicator is provided while a content item is being accessed, according to an embodiment of the present disclosure.
Figure 4B:
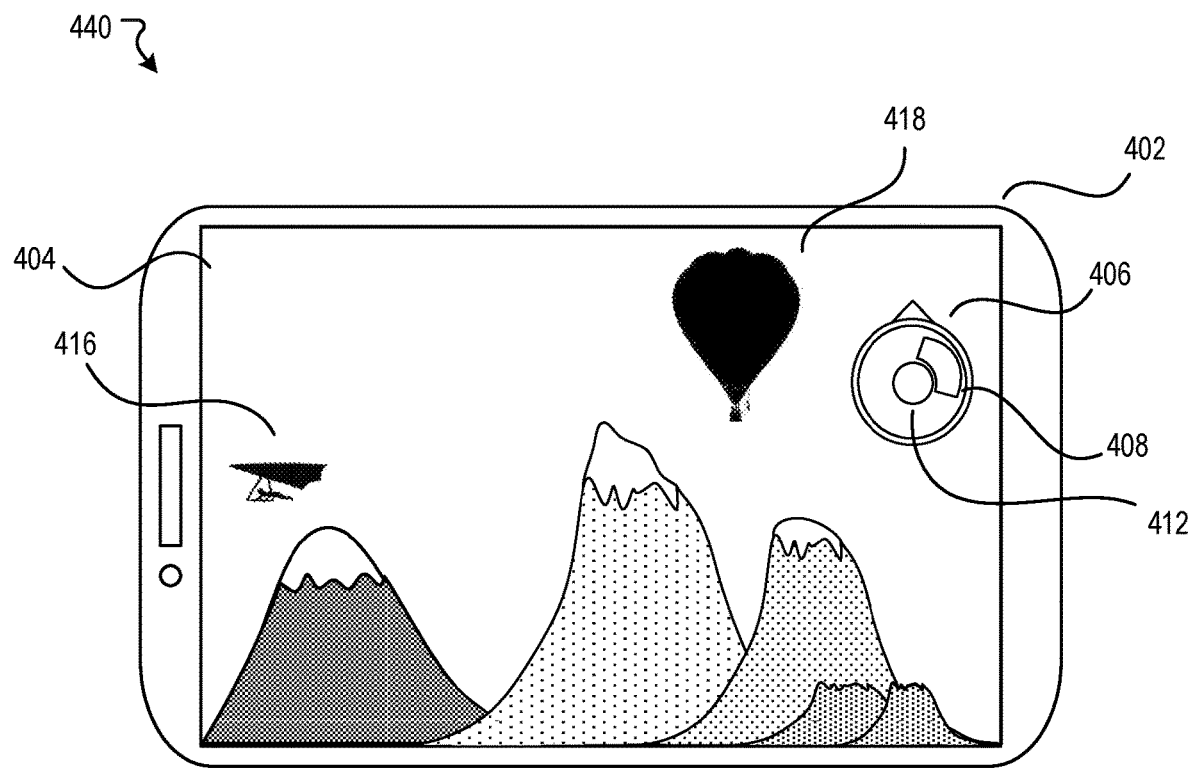

FIG. 4A illustrates an example 400 of a viewport interface 404 in which a navigation indicator 406 is provided while a content item (e.g., virtual content item) is being accessed, according to an embodiment of the present disclosure. In this example, the viewport 404 is presented on a display screen of the computing device 402. Further, the viewport 404 may be provided through a software application (e.g., a web browser, a social networking application, etc.) running on the computing device 402. The location and/or size of the navigation indicator 406 as shown in the display screen may vary depending on the implementation. In the example of FIG. 4A, the viewport 404 is presenting a scene from a virtual content item. In this example, the scene includes, among other points of interest, a pair of birds 414 and a hang glider 416. The viewport 404 includes a navigation indicator 406 which includes a heading indicator 408 for identifying the direction and zoom level of the viewport, as described above. The navigation indicator 406 also indicates that a point of interest 410 has been identified and is located in an eastern direction relative to the viewport direction identified by the heading indicator 408. The user operating the computing device 402 navigate the scene, for example, by changing the direction and/or zoom level of the viewport as described above. For example, the user can change the direction of the viewport to face the direction 410 corresponding to the point of interest. As a result, the viewport can be updated to present content (e.g., images and/or video streams) that correspond to the direction 410, as illustrated in the example of FIG. 4B. In some embodiments, the navigation indicator 406 can also identify other types of events occurring in the scene(s) being accessed besides points of interest. For example, the navigation indicator 406 can indicate the direction of a sound that was made in a scene.

In some embodiments, the navigation indicator 406 is initially shown as being semi-transparent or faded. In such embodiments, the navigation indicator 406 becomes opaque upon detecting user interaction, for example, with the viewport 404 and/or the computing device 402. The navigation indicator 406 can also become opaque when the user performs a touch gesture in a region of the display screen that corresponds to the navigation indicator 406. For example, the navigation indicator 406 may detect user interaction based on sensors in the computing device. In some embodiments, the navigation indicator 406 may return to the semi-transparent or faded state if no user interaction is detected for a threshold period of time. In some embodiments, an auto mode may be activated by default when a virtual content item is accessed. In such embodiments, while in auto mode, the viewport can be navigated automatically through the scene(s) in the virtual content item. For example, a publisher of the virtual content item may specify one or more points of interest in the scene(s) and the viewport can automatically be guided so that the points of interest are shown. In some embodiments, the respective trajectories as the viewport moves between the points of interest can be automatically generated. In some embodiments, a point of interest may be defined as a spatial region in the scene(s) at a moment in time, or period of time, corresponding to the video stream being presented through the viewport. In some embodiments, points of interest may be associated with temporal information that indicates an amount of time at which the viewport should focus on the point of interest (e.g., 3 seconds at a first point of interest, 5 seconds at a second point of interest, etc.).

FIG. 4B illustrates an example 440 of the viewport interface 404 in which the navigation indicator 406 is provided while the content item (e.g., virtual content item) is being accessed, according to an embodiment of the present disclosure. In this example, the direction of the viewport 404, which is presented on the display screen of the computing device 402, has been changed to face the direction corresponding to the point of interest 418 that was indicated in the navigation indicator 406 in FIG. 4A as a point of interest 410. As a result, the scene presented in the viewport 404 has been updated to present content (e.g., images and/or video streams) that corresponds to the viewport adjustment. In this example, the scene shows, among other points of interest, the hang glider 416 and a hot air balloon 418 that was identified by the navigation indicator 406 as the point of interest 410. In FIG. 4B, the heading indicator 408 has been rotated to the right around the point 412 to correspond to the change in the direction of the viewport. In some embodiments, the user operating the computing device 402 can perform a touch gesture in a region of the display screen that corresponds to the navigation indicator 406 to cause the viewport to return to the initial, or intended, heading defined for the virtual content item. In such embodiments, the zoom level of the viewport is also reset to the default or intended zoom level that was defined for the virtual content item upon detecting the touch gesture. The heading indicator 408 may rotate around the point 412 in a clockwise or counter-clockwise direction, for example, depending on the direction in which the user navigates the viewport. For example, changes to the viewport direction from 0 to 180 degrees may cause the heading indicator 408 to rotate around the point 412 in a clockwise direction while changes to the viewport direction from 180 to 360 degrees may cause the heading indicator 408 to rotate around the point 412 in a counter-clockwise direction.

Figure 4C:
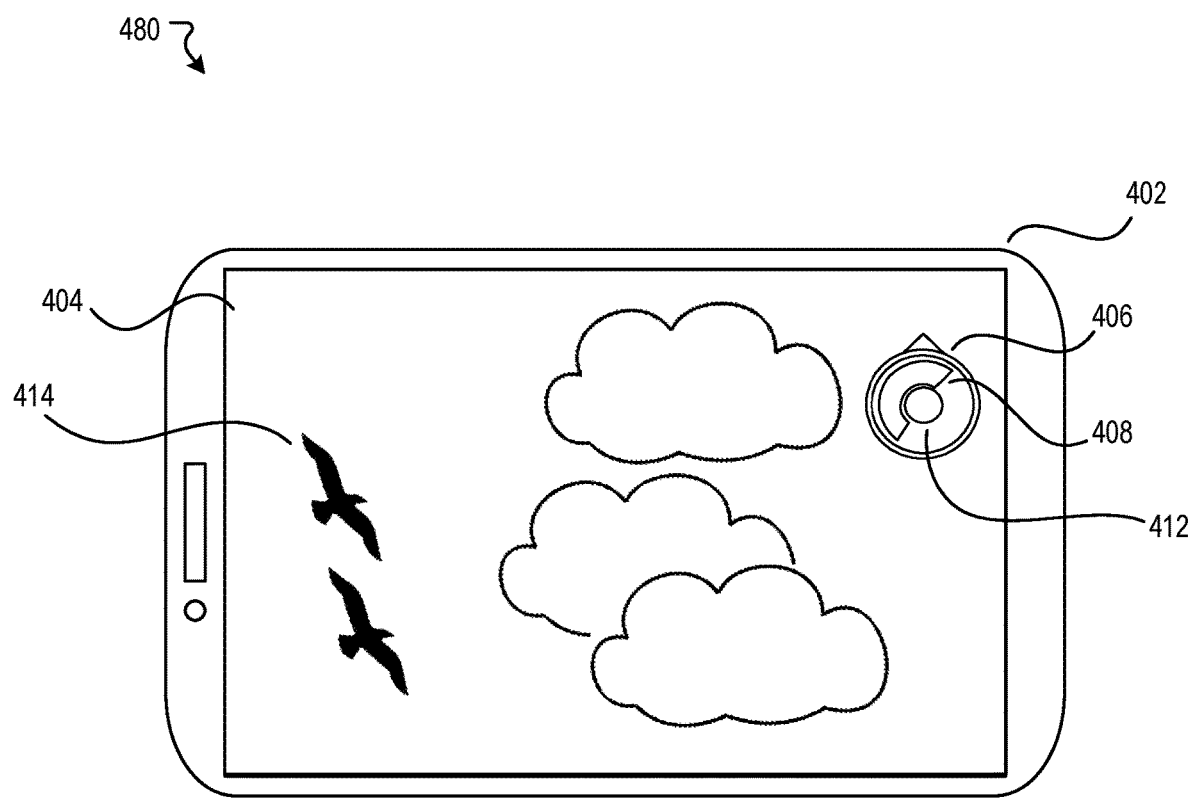

FIG. 4C illustrates an example 480 of the viewport interface 404 in which the navigation indicator 406 is provided while the content item (e.g., virtual content item) is being accessed, according to an embodiment of the present disclosure. In this example, the direction of the viewport 404, which is presented on the display screen of the computing device 402, has been changed to face the pair of birds 414 that were shown in the scene in FIG. 4A. The zoom level of the viewport 404 has also been increased. As a result, the scene presented in the viewport 404 has been updated to present content (e.g., images and/or video streams) that corresponds to the viewport adjustment. In this example, the scene shows, among other points of interest, the pair of birds 414 to which the user has focused the viewport. In FIG. 4C, the heading indicator 408 has been rotated around the point 412 to face the direction of the pair of birds 414 in the scene to correspond to the change in the direction of the viewport. In this example, the heading indicator 408 has also increased in size around the point 412 to indicate the increased zoom level of the viewport.

FIG. 5 illustrates an example method 500 for providing a navigation indicator accessing content through an interface, according to an embodiment of the present disclosure. It should be appreciated that there can be additional, fewer, or alternative steps performed in similar or alternative orders, or in parallel, within the scope of the various embodiments discussed herein unless otherwise stated. At block 502, a determination of at least one request to access a content item is made, wherein the content item was composed using a set of camera feeds that capture at least one scene from a set of different positions. At block 504, a viewport interface is provided on a display screen of the computing device through which playback of the content item is presented, the viewport interface being configured to allow a user operating the computing device to virtually navigate the at least one scene by changing i) a direction of the viewport interface relative to the scene or ii) a zoom level of the viewport interface. At block 506, a navigation indicator is provided in the viewport interface, the navigation indicator being configured to visually indicate any changes to a respective direction and zoom level of the viewport interface during playback of the content item.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
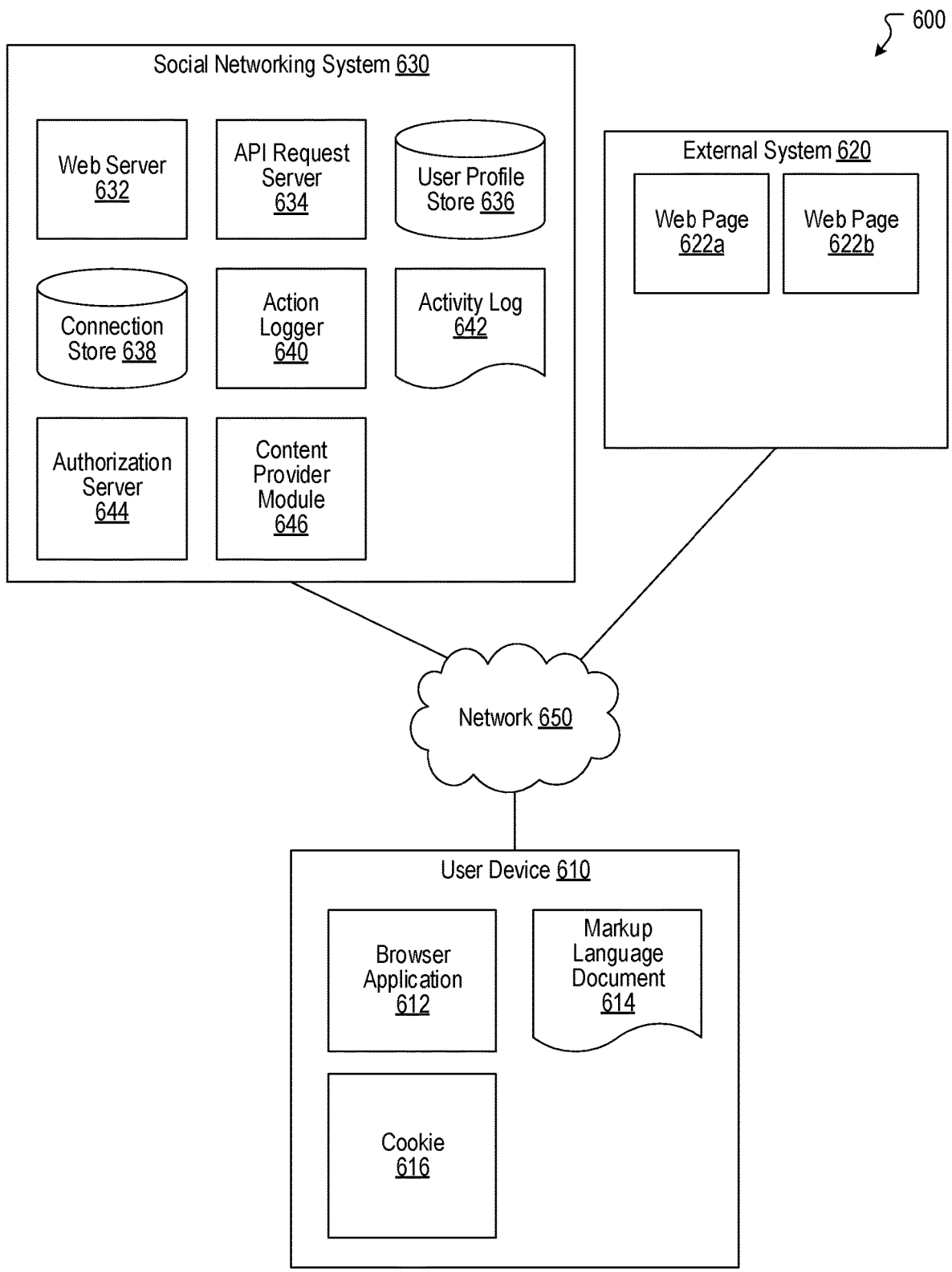
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622*a*, 622*b*, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. As discussed previously, it should be appreciated that there can be many variations or other possibilities.

Hardware Implementation

Figure 7:
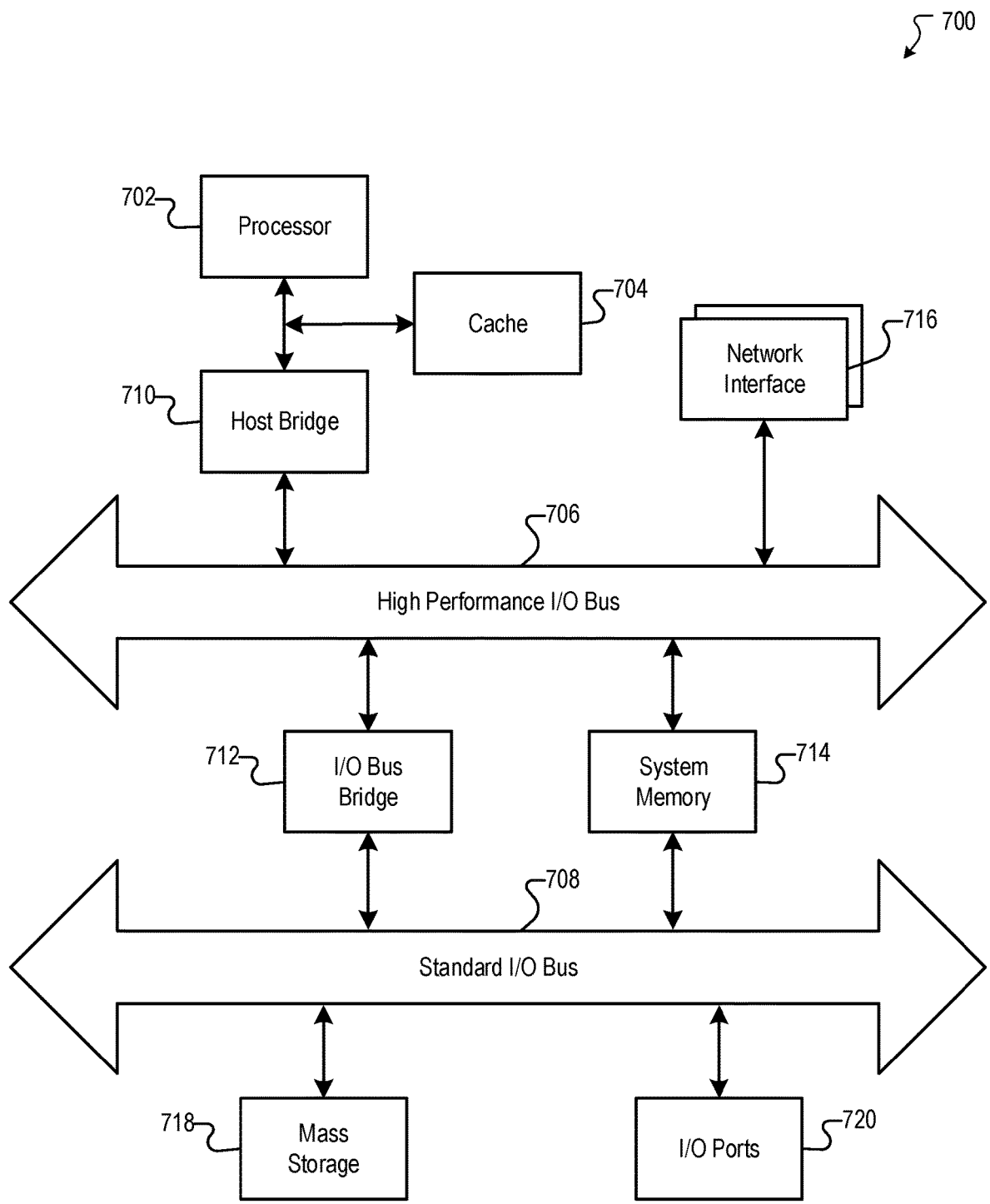
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/ output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    determining, by a computing device, at least one request to access a content item provided by a content provider, wherein the content item was composed using a set of camera feeds that capture a first scene and a second scene from a set of different positions;
    providing, by the computing device, a viewport interface on a display screen of the computing device through which playback of the content item is presented, the viewport interface being configured to allow a user operating the computing device to virtually navigate the first scene and the second scene by changing at least a direction of the viewport interface relative to the first scene or the second scene,
        wherein the first scene and the second scene are associated with a specification of the content provider,
        wherein the specification defines points of interest, including a first point of interest associated with the first scene and a second point of interest associated with the second scene, to focus the viewport interface to display the first point of interest in the first scene for a first period of time followed by the second point of interest in the second scene for a second period of time during the playback of the content item;
    providing, by the computing device, a navigation indicator in the viewport interface, the navigation indicator being configured to visually indicate changes to a respective direction and a zoom level of the viewport interface during the playback of the content item;
    determining, by the computing device, that the content item is associated with an auto mode that specifies information for virtually navigating a set of points of interest in the first scene or the second scene;
    causing, by the computing device, the navigation indicator to visually indicate that the auto mode is enabled;
    determining, by the computing device, a trajectory to automatically guide the viewport interface from the first point of interest to the second point of interest during the playback;
    causing, by the computing device, the viewport interface to automatically navigate the content item based on the trajectory;
    determining, by the computing device, that the user has performed one or more operations to change the direction of the viewport interface during the playback;
    in response to the determining that the user has performed the one or more operations to change the direction of the viewport interface during the playback:
        causing, by the computing device, the auto mode to be disabled; and
        causing, by the computing device, the viewport interface to correspond to the changed direction or zoom level, wherein the navigation indicator no longer indicates that the auto mode is enabled;
    determining, by the computing device, a respective direction from the viewport interface to at least one of the first point of interest in the first scene or the second point of interest in the second scene; and
    causing, by the computing device, the navigation indicator to visually indicate the respective direction to the at least one of the first point of interest or the second point of interest in addition to visually indicating the direction of the viewport interface.

2. The computer-implemented method of claim 1, the method further comprising:
    determining, by the computing device, a respective direction of at least one sound produced during the playback of the content item; and
    causing, by the computing device, the navigation indicator to visually indicate the respective direction of the at least one sound in addition to visually indicating the direction and zoom level of the viewport interface.

3. The computer-implemented method of claim 1, the method further comprising:
    determining, by the computing device, that a threshold amount of time has elapsed since the user performed the one or more operations to change the direction or the zoom level of the viewport interface;
    causing, by the computing device, the auto mode to be re-enabled; and
    causing, by the computing device, the navigation indicator to visually indicate that the auto mode is enabled.

4. The computer-implemented method of claim 1, the method further comprising:
    determining, by the computing device, that the user has performed a touch gesture on a region of the display screen that corresponds to the navigation indicator; and
    causing, by the computing device, the viewport interface to correspond to a direction and zoom level that was specified by a publisher of the content item in the specification.

5. The computer-implemented method of claim 1, wherein the one or more operations include at least one touch gesture or device gesture.

6. A system comprising:
    at least one processor; and
    a memory storing instructions that, when executed by the at least one processor, cause the system to perform:
        determining at least one request to access a content item provided by a content provider, wherein the content item was composed using a set of camera feeds that capture a first scene and a second scene from a set of different positions;
        providing a viewport interface on a display screen of a computing device through which playback of the content item is presented, the viewport interface being configured to allow a user operating the computing device to virtually navigate the first scene and the second scene by changing at least a direction of the viewport interface relative to the first scene or the second scene, wherein the first scene and the second scene are associated with a specification of the content provider,
wherein the specification defines points of interest, including a first point of interest associated with the first scene and a second point of interest associated with the second scene, to focus the viewport interface to display the first point of interest in the first scene for a first period of time followed by the second point of interest in the second scene for a second period of time during the playback of the content item;
providing a navigation indicator in the viewport interface, the navigation indicator being configured to visually indicate changes to a respective direction and a zoom level of the viewport interface during the playback of the content item;
determining that the content item is associated with an auto mode that specifies information for virtually navigating a set of points of interest in the first scene or the second scene;
causing the navigation indicator to visually indicate that the auto mode is enabled;
determining a trajectory to automatically guide the viewport interface from the first point of interest to the second point of interest during the playback;
causing the viewport interface to automatically navigate the content item based on the trajectory;
determining that the user has performed one or more operations to change the direction of the viewport interface during the playback;
in response to the determining that the user has performed the one or more operations to change the direction of the viewport interface during the playback:
  causing the auto mode to be disabled; and
  causing the viewport interface to correspond to the changed direction or zoom level, wherein the navigation indicator no longer indicates that the auto mode is enabled;
determining a respective direction from the viewport interface to at least one of the first point of interest in the first scene or the second point of interest in the second scene; and
causing the navigation indicator to visually indicate the respective direction to the at least one of the first point of interest or the second point of interest in addition to visually indicating the direction of the viewport interface.

7. The system of claim 6, wherein the instructions further cause the system to perform:
determining a respective direction of at least one sound produced during the playback of the content item; and
causing the navigation indicator to visually indicate the respective direction of the at least one sound in addition to visually indicating the direction and zoom level of the viewport interface.

8. The system of claim 6, wherein the instructions further cause the system to perform:
determining that a threshold amount of time has elapsed since the user performed the one or more operations to change the direction or the zoom level of the viewport interface;
causing the auto mode to be re-enabled; and
causing the navigation indicator to visually indicate that the auto mode is enabled.

9. The system of claim 6, wherein the instructions further cause the system to perform:

determining that the user has performed a touch gesture on a region of the display screen that corresponds to the navigation indicator; and
causing the viewport interface to correspond to a direction and zoom level that was specified by a publisher of the content item in the specification.

10. A non-transitory computer-readable storage medium including instructions that, when executed by at least one processor of a computing system, cause the computing system to perform a method comprising:
determining at least one request to access a content item provided by a content provider, wherein the content item was composed using a set of camera feeds that capture a first scene and a second scene from a set of different positions;
providing a viewport interface on a display screen of a computing device through which playback of the content item is presented, the viewport interface being configured to allow a user operating the computing device to virtually navigate the first scene and the second scene by changing at least a direction of the viewport interface relative to the first scene or the second scene,
wherein the first scene and the second scene are associated with a specification of the content provider,
wherein the specification defines points of interest, including a first point of interest associated with the first scene and a second point of interest associated with the second scene, to focus the viewport interface to display the first point of interest in the first scene for a first period of time followed by the second point of interest in the second scene for a second period of time during the playback of the content item;
providing a navigation indicator in the viewport interface, the navigation indicator being configured to visually indicate changes to a respective direction and a zoom level of the viewport interface during the playback of the content item;
determining that the content item is associated with an auto mode that specifies information for virtually navigating a set of points of interest in the first scene or the second scene;
causing the navigation indicator to visually indicate that the auto mode is enabled;
determining a trajectory to automatically guide the viewport interface from the first point of interest to the second point of interest during the playback;
causing the viewport interface to automatically navigate the content item based on the trajectory;
determining that the user has performed one or more operations to change the direction of the viewport interface during the playback;
in response to the determining that the user has performed the one or more operations to change the direction of the viewport interface during the playback:
  causing the auto mode to be disabled; and
  causing the viewport interface to correspond to the changed direction or zoom level, wherein the navigation indicator no longer indicates that the auto mode is enabled;
determining a respective direction from the viewport interface to at least one of the first point of interest in the first scene or the second point of interest in the second scene; and
causing the navigation indicator to visually indicate the respective direction to the at least one of the first point of interest or the second point of interest in addition to visually indicating the direction of the viewport interface.

11. The non-transitory computer-readable storage medium of claim 10, wherein the instructions further cause the computing system to perform:
    determining a respective direction of at least one sound produced during the playback of the content item; and
    causing the navigation indicator to visually indicate the respective direction of the at least one sound in addition to visually indicating the direction and zoom level of the viewport interface.

12. The non-transitory computer-readable storage medium of claim 10, wherein the instructions further cause the computing system to perform:
    determining that a threshold amount of time has elapsed since the user performed the one or more operations to change the direction or the zoom level of the viewport interface;
    causing the auto mode to be re-enabled; and
    causing the navigation indicator to visually indicate that the auto mode is enabled.

13. The non-transitory computer-readable storage medium of claim 10, wherein the instructions further cause the computing system to perform:
    determining that the user has performed a touch gesture on a region of the display screen that corresponds to the navigation indicator; and
causing the viewport interface to correspond to a direction and zoom level that was specified by a publisher of the content item in the specification.

* * * * *